United States Patent [19]
Fulghum et al.

[11] 3,961,542
[45] June 8, 1976

[54] CONTROL LINKAGE FOR HYDROSTATIC TRANSMISSION

[75] Inventors: David A. Fulghum, La Grange; John R. Badini, Villa Park, both of Ill.

[73] Assignee: International Harvester Company, Chicago, Ill.

[22] Filed: Jan. 10, 1975

[21] Appl. No.: 540,199

[52] U.S. Cl. .............................. 74/470; 64/27 NM; 64/DIG. 2; 403/225
[51] Int. Cl.² .......................................... F16D 3/76
[58] Field of Search ......................... 74/470, 471 R; 64/27 NM, 27 R, 11 R, 14; 403/225

[56] References Cited
UNITED STATES PATENTS

| | | | |
|---|---|---|---|
| 1,445,160 | 2/1923 | Osborn | 74/470 X |
| 2,084,080 | 6/1937 | D'Aubarede | 64/27 NM |
| 3,023,593 | 3/1962 | Nallinger | 64/14 X |
| 3,046,759 | 7/1962 | Deford et al. | 64/27 NM X |
| 3,320,771 | 5/1967 | Roethlisberger et al. | 64/27 NM |
| 3,354,981 | 11/1967 | Swanson et al. | 74/471 X |
| 3,821,882 | 7/1974 | Eheim | 64/14 X |

*Primary Examiner*—Allan D. Hermann
*Attorney, Agent, or Firm*—William H. Wendell; Floyd B. Harman

[57] ABSTRACT

A cam operated control link mounts on the trunnion shaft of a transmission swash plate through an interposed elastomeric collar or bushing providing for both a damping of vibration transfer from the transmission to the controls and an initial deflection lag of approximately four degrees between rotation of the link and rotation of the trunnion shaft and associated swash plate. Limit pin means preclude an independent movement of the link relative to the trunnion shaft beyond pre-set extremes.

8 Claims, 5 Drawing Figures

CONTROL LINKAGE FOR HYDROSTATIC TRANSMISSION

The invention herein is generally concerned with vehicle speed control mechanisms of the type disclosed in U.S. Pat. No. 3,354,981, and more particularly relates to improved means for controlling the tilt of a swash plate in the hydraulic drive pump of a hydrostatic transmission adapted for incorporation in a propellable vehicle.

The overall environment of the invention is detailed in the above noted patent. Basically, in hydrostatic transmission units the swash plate of the hydraulic drive pump is rotated about an axis transverse to the axis of rotation of axially displacable piston elements of the pump so as to provide a variable output from the pump as well as to control the directional flow of fluid therefrom whereby the direction of rotation of an associated fluid motor, frequently employed for propelling a vehicle, is controlled. In such vehicles, rotation of the swash plate is normally effected by hand operated mechanisms.

The present invention proposes, as its primary object, the provision of control means for the swash plate which substantially reduces vibration induced noise levels and at the same time provides a shift lag in adjustment of the swash plate to effect a smooth engagement of the pump, preventing instantaneous engagement thereof such as could substantially affect control of the vehicle.

The control means, orientated between the swash plate and a hand lever or the like, includes a link and a cam plate for controlling movement thereof. The link has a first end incorporating a projecting pin received within and guided by an elongated caming slot formed in the cam plate. The second end of the link is received about and fixed to a trunnion shaft of the swash plate through an interposed elastomeric collar or bushing whereby cam induced rotation of the link will effect a rotation of the trunnion shaft and swash plate. The elastomeric bushing, through the memory characteristics thereof, is set so as to provide for an approximate four-degree lag in movement of the swash plate relative to the link. In this manner, there is a smooth engagement of the swash plate controlled transmission and an avoidance of an instantaneous engagement thereof such as could, in an extreme example, life the front steering wheels of a tractor or like vehicle. This torque transmitting elastomeric bushing additionally functions so as to effect a substantial reduction in the level of transmission generated noises and vibrations normally directly transmitted through the control system. Such noise transfer is substantial even when utilizing spring assemblies of the type disclosed in U.S. Pat. No. 3,354,981. As an additional feature, in order to prevent excess movement of the link relative to the trunnion shaft due to a worn bushing or the like, a pair of abutments are provided on the link for engagement with a shaft mounted pin at opposed predetermined movement extremes.

These and other features, objects and advantages of the invention will become apparent from the details of construction and operation as more fully hereinafter described and claimed. Reference is had to the accompanying drawings forming a part hereof wherein the like numerals refer to like parts throughout, and in which:

Figure 1:
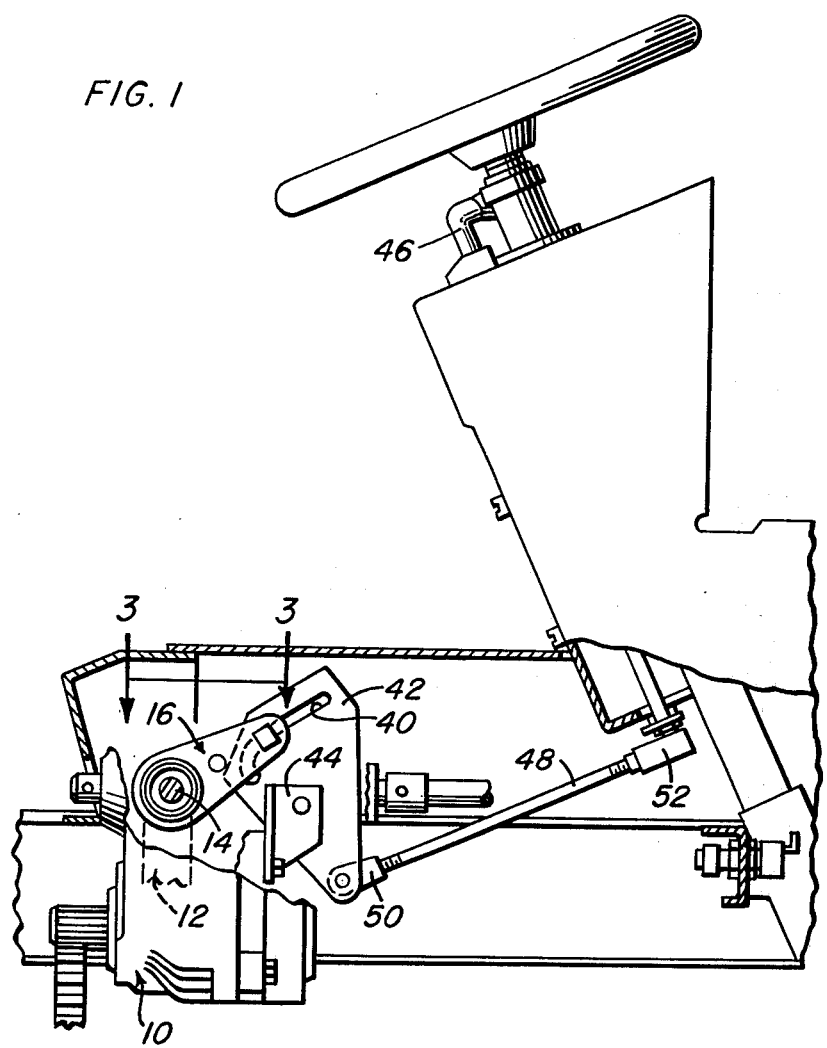
FIG. 1 is a side elevational view of a hydrostatic transmission unit with the control mechanism of the present invention associated therewith.
Figure 3:
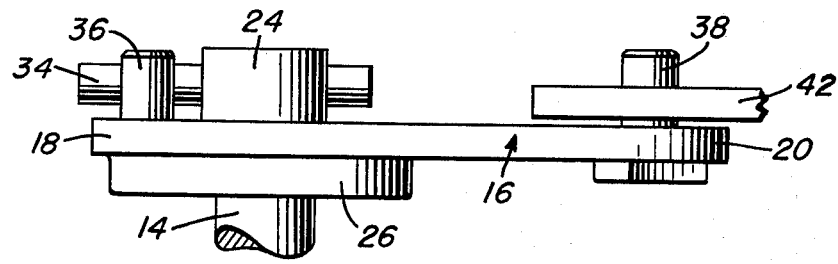
FIG. 3 is an enlarged detail of the control mechanism taken substantially on a plane passing along line 3—3 in FIG. 1.
Figure 2:
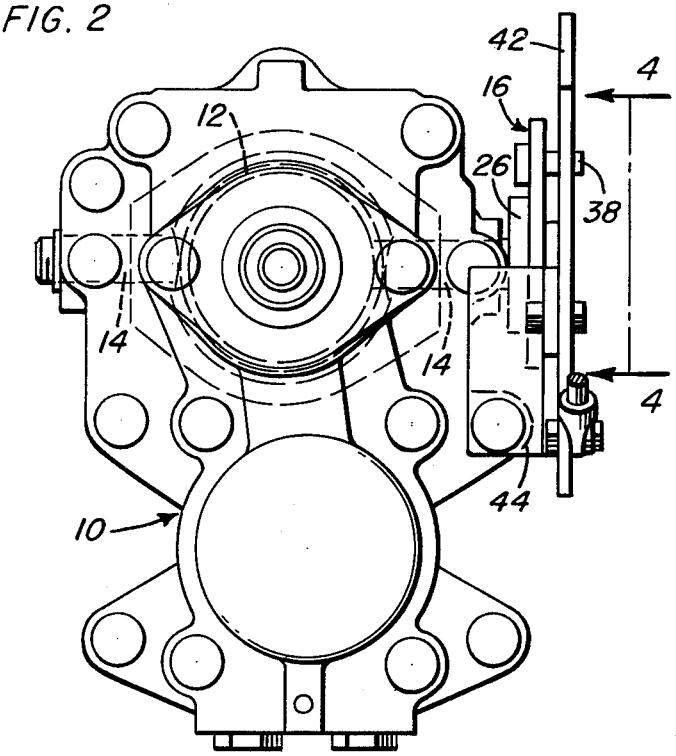
FIG. 2 is an end elevational view of the transmission unit of FIG. 1 with the control mechanism mounted thereon.

Referring now more specifically to the drawings, reference numeral 10 designates a hydrostatic transmission unit of the type disclosed in the above noted patent. The internal swash plate 12 mounts for rotation on a pair of oppositely directed trunnion shafts 14 journaled in the transmission housing in the conventional manner.

Figure 4:
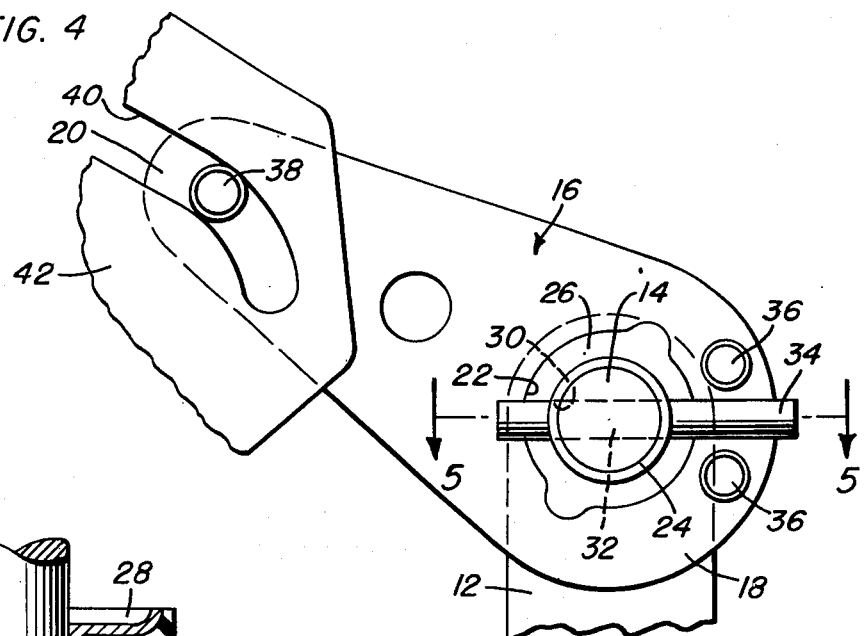
FIG. 4 is an elevational view of the mechanism taken substantially on a plane passing along line 4—4 in FIG. 2.
Figure 5:
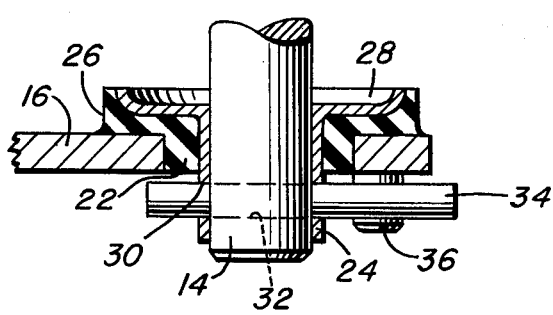
FIG. 5 is a cross-sectional detail taken substantially on a plane passing along line 5—5 in FIG. 4.

It is control of the relative rotational position of this swash plate with which the invention is generally concerned. In furtherance thereof, an elongated rigid link or arm 16 is provided. The link 16 is of a configuration which will be best appreciated from FIG. 4, tapering from a first enlarged rounded end portion 18 to a second substantially smaller end portion 20. The enlarged end portion 18 of the link 16 includes an enlarged aperture or opening 22 therethrough through which an elongated sleeve member 24 is centrally received. The aperture 22 is of a substantially greater diameter than the sleeve member 24 and an elastomeric collar or bushing 26 is interposed between and bonded to both the sleeve member 24 and the link 16 peripherally about the aperture 22. An integral flange 28 is provided about the inner end of the sleeve member 24, projecting outwardly therefrom in overlying relation to the adjoining portion of the inner face of link 16, the bushing 22 being also interposed between and bonded to the annular flange 28 and corresponding portion of the face of the link 16.

The outer end of the sleeve member 24 projects beyond the outer face of the link 16 and is keyed or otherwise rigidly affixed to the projecting end portion of one of the trunnion shafts 14 for a mounting of the link 16 thereon. The outwardly projecting portion of the sleeve member 24, along with the received portion of the trunnion shaft 14 will also preferably be provided with transverse passage means 30 and 32, respectively, therethrough within which an elongated limit pin 34 is received and fixed. As will be appreciated, this pin 34 can actually constitute the means locking the trunnion shaft 14 within the sleeve member 24. One end of the limit pin 34 projects radially beyond the sleeve 24 and is received between a pair of spaced pin-like abutements 36 affixed to the outer face of the link 16 in outwardly spaced relation to the projecting portion of the sleeve member 24 for limiting the rotational movement of the link 16 relative to the pin 34 and hence the trunnion shaft 14 of the swash plate 12.

A pin-like cam follower 38 is affixed to the smaller end portion 20 of the link 16 and projects outwardly of the outer face thereof for engagement within an elongated cam slot 40 defined within a cam plate 42 pivotally mounted by appropriate bracket means 44 to the frame of the vehicle. This cam plate 42 and associated camming slot 40 essentially correspond in structure and operation to the cam plate described in U.S. Pat. No. 3,354,931 insofar as controlling displacement of the cam follower 38 for an ultimate rotational control of the swash plate. Pivotal control of the cam plate 42 is in turn manually controlled by the control lever 46 engaged therewith through an elongated rod link 48 and appropriate ball joint couplers 50 and 52.

As will be appreciated from the foregoing, the invention herein resides in the control linkage provided between the cam plate 42 and the trunnion shaft 14. The elastomeric bushing 26 will preferably be a 40 (plus or minus 3) durometer natural rubber compounded with good flex and low set characteristics. The rubber is to have a spring rate of 15 (plus or minus 3) inch pounds per degree rotation, resulting in torque required to deflect the link 16 4° being 60 inch pounds (plus or minus 20%). This in turn will, when operating in conjunction with a conventional swash plate in the environment of the invention, produce the desired four degree lag prior to torque transmitted movement between the link 16 and the swash plate trunnion shaft 14. This is considered significant for several reasons including significant noise reduction and overall smooth operation. As an example, the four degree lag prior to torque transmitted movement will substantially completely isolate the relatively high vibrations generated by the hydrostatic transmission during operation from the swash plate control system including the control handle 46 and multiple links, couplings and the like operable thereby in control of the cam plate as more specifically detailed in the above noted patent. In addition, the built-in lag functions as a significant operational feature in preventing instantaneous engagement of the transmission, providing, as a result of the memory characteristics of the bushing, a smooth initiation of movement of the vehicle and a smooth transition from forward to reverse or reverse to forward.

The limit pin 34 and associated pin-like abutements 36 are of significance in insuring control of the transmission should the torque transmitting elastomeric bushing 26 fail for any reason, the space in between the abutements 36 being set so as to engage the limit pin 34 upon a four degree rotation of the link 16 relative to the trunnion shaft 14, with the four degrees being the limit of the lag range.

The foregoing is considered illustrative of the principles of the invention. It will be apparent to those skilled in the art that various changes and modifications may be resorted to without deviating from the spirit or scope of the invention.

What is claimed as new is:

1. In a vehicle hydrostatic transmission system, a swash plate, trunnion shaft means fixed to and extending from said swash plate for rotational mounting of said swash plate, said shaft means having a limit pin fixed to and projecting laterally therefrom, a movably mounted control arm having a pair of spaced abutments for receiving said limit pin therebetween for force transmission engagement therewith and having an aperture for receiving said shaft means, and an elastomeric bushing bonded to and engaged between said arm and said shaft means for selective transmission of torque therebetween, said bushing being elastically deformable to a predetermined degree prior to transmission of torque beyond which deformation said limit pin engages said abutment and said bushing transmits torque.

2. The invention of claim 1 wherein said bushing surrounds the shaft means within the aperture.

3. The invention of claim 2 wherein said shaft means includes a trunnion shaft and a sleeve member fixed thereabout, said sleeve member being received through the control arm aperture and including a first end having an integral annular flange thereabout overlying the aperture surrounding portion of one side of the control arm, said bushing surrounding said sleeve within the aperture and between the annular flange and overlaid aperture surrounding portion.

4. For use in a vehicle hydrostatic transmission system having a swash plate with at least one outwardly projecting plate mounting trunnion shaft; a shaft engageable control linkage, said linkage comprising an elongated control arm, an aperture defined through one end portion of said arm, a sleeve member received through the aperture and adapted to fixedly receive the shaft therein, and an elastomeric bushing surrounding said sleeve member within the aperture for a damping of vibration transmissions therebetween, said bushing being bonded to said sleeve member and aperture defining portion of the arm for a selective transmission of torque therebetween.

5. The control linkage of claim 4 wherein said sleeve member includes an outwardly projecting flange about one end thereof overlying one side of said control arm, said bushing extending between said flange and the control arm.

6. The control linkage of claim 4 wherein said elastomeric bushing has a spring rate of 15 plus or minus 3 inch pounds per degree of rotation.

7. The control linkage of claim 4 wherein said sleeve projects beyond the second side of said control arm with the projecting portion of said sleeve receiving a limit pin transversely therethrough, said limit pin projecting laterally beyond the sleeve member and overlying the second side of said control arm, and a pair of spaced abutments fixed to the second side of said control arm and receiving the projecting portion of the pin therebetween for selective engagement of either abutment with the pin upon rotation of the control arm relative to the sleeve member beyond a predetermined degree.

8. The control linkage of claim 7 including a cam follower defined at the second end portion of said control arm for engagement with and control by an adjustable cam plate.

* * * * *